United States Patent Office 3,632,638
Patented Jan. 4, 1972

3,632,638
PRODUCTION OF LOWER ALIPHATIC ACIDS FROM OLEFINS
Daniel Hyman, Greenwich, Conn., assignor to American Cyanamid Company, Stamford, Conn.
No Drawing. Filed Feb. 18, 1969, Ser. No. 800,250
Int. Cl. C07c 53/22
U.S. Cl. 260—533 A        5 Claims

ABSTRACT OF THE DISCLOSURE

For high pressure reaction of an olefin such as propylene with carbon monoxide and water to produce a carboxylic acid such as isobutyric acid, a suitable catalyst comprises a substantial proportion of hydroxyalkane sulfonic acid and its sulfuric acid ester which are products of sulfonation of the olefin used in the carboxylic acid synthesis. In most embodiments the catalyst will also contain some sulfuric acid. The catalyst is readily recovered from carboxylic acid product by vacuum distillation and can be recycled directly to the high pressure reaction zone.

---

This invention relates to synthesis of carboxylic acids and more specifically to synthesis of lower aliphatic acids by reaction of carbon monoxide with an olefin and water in presence of a catalyst. Particularly, the invention relates to improvements in catalyst compositions for such synthesis and to improvements in processes involving use of such catalyst compositions.

U.S. Pat. No. 2,831,877 describes synthesis of carboxylic acids by reaction of formic acid or carbon monoxide with olefins in presence of sulfuric acid catalyst of at least 90% strength followed by addition of water to the reaction mixture to complete the synthesis. The first stage of the reaction is carried out under pressure at moderate temperature. U.S. Pat. No. 3,053,869 describes a similar process employing as catalyst a spent alkylation acid having total titratable $H_2SO_4$ content from 79% to 90% by weight. This spent alkylation acid is described in the patent as containing 80%–90% $H_2SO_4$ on the basis of total titratable acidity and containing only from 1–5% water with the remainder being "red oils" which are complex mixtures of polyolefins, organic sulfates and sulfonates.

The foregoing patents emphasize necessity for high $H_2SO_4$ concentration in the catalyst as well as low water content. U.S. Pat. No. 2,876,241 describes difficulties encountered using high concentration sulfuric acid as a catalyst in the organic acid synthesis. For completion of the process it was necessary to add substantial amounts of water, then most of this water had to be removed to reconcentrate the sulfuric acid for recycle as a catalyst. Hydroxyalkylsulfonic acids could not be easily separated from sulfuric acid, and in certain stages of concentration by evaporation these were found to cause carbonization and tar formation with evolution of $SO_2$. Therefore, instead of reconcentrating the sulfuric acid catalyst by evaporation the art has envisioned more expensive acid regeneration or has tended toward use of catalyst substitutes, such as the acid mixtures described in U.S. Pat. No. 2,876,241.

U.S. Pat. No. 3,282,973 describes use of certain organic sulfonic acids as catalyst for the same reactions, i.e., olefin with CO and water to produce organic acids. The catalysts of that patent differ from those of the present invention in the significant fact that the sulfonic acid of the present catalyst is a hydroxyalkyl sulfonic acid or a mixture thereof with its sulfuric acid ester, which conveniently may be the product of sulfonation of the same olefin used in the carboxylic acid synthesis. One of the sulfonic acid catalysts of U.S. 3,282,973 was alkanesulfonic acid derived from sulfonation of paraffins. A principal advantage of the catalyst of the present invention over those described in U.S. Pat. No. 3,282,973 is that the hydroxyalkanesulfonic acid and its sulfuric acid ester, which are components of the present catalyst, will be produced as by-products of the same process in which the catalyst is intended for use.

Thus in a continuous process for production of the carboxylic acid product, involving recycling of the catalyst in the process, the olefin sulfonation products, which are essential catalyst components according to the invention, may be produced in the process as the catalyst is circulated. This continuous process can proceed without need to add make-up for olefin sulfonation products lost in the process. Make-up of any catalyst loss can be done by simply adding sulfuric acid which reacts with the olefin reactant to produce the sulfonation products. This make-up as needed usually will be in such small proportions that the make-up does not radically alter the catalyst composition as the continuous process proceeds.

An object of the invention is to provide new catalysts for the reaction of carbon monoxide with aliphatic olefins and water or of formic acid with olefins to form alkyl carboxylic acids. An advantage of a catalyst of the present invention over the concentrated $H_2SO_4$ catalysts of prior art is that it can be recycled to the reaction chamber after separation of carboxylic acid product and water by evaporation without need for the more expensive sulfuric acid regeneration envisioned in prior art.

According to the invention, in the carboxylic acid synthesis described, we employ a catalyst comprising substantial proportions of olefin sulfonation products, i.e., hydroxyalkanesulfonic acid and sulfuric acid ester thereof, ether alone or preferably in a catalyst mixture also comprising sulfuric acid. In the manufacture of isobutyric acid from propylene, for example, a propylene sulfonation by-product will be 2-hydroxypropane-1-sulfonic acid:

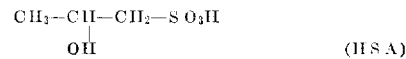

(HSA)

which is the product of sulfonation of one mole propylene with one mole sulfuric acid. Another propylene sulfonation by-product is the sulfuric acid ester of the first by-product,

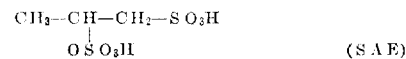

(SAE)

which is the product of condensation of the hydroxypropane sulfonic acid with another mole of sulfuric acid. For brevity, we shall refer to the first sulfonation product described above as HSA and the second product as SAE. In catalyst mixture with sulfuric acid, both of these sulfonation products exist together in the catalyst mixture in equilibrium and the relative concentrations of the two at equilibrium will depend upon several variables such as concentration of sulfuric acid in the catalyst mixture, concentration of water in mixture with the catalyst, temperature of the mixture and other factors which may vary as the catalyst is circulated and recycled through the reaction zones and the product recovery zones. Generally, it can be stated that in the high pressure reaction zone, the equilibrium will tend toward increasing concentration of SAE and in the zones where the catalyst is present with higher concentrations of water the equilibrium tends toward increasing concentration of HSA. A catalyst composition useful in accordance with the invention will consist of from about 15 up to 100 wt. percent olefin sulfonation products, from 0 to about 75 ft. percent $H_2SO_4$, usually about 5–20 wt. percent and preferably not more than about 30 wt. percent wtaer. As the catalyst is recycled in a continuous process, small amounts of miscellaneous organic by-products may develop in the catalyst feed but seldom to the extent of more than about 15% of the mixture. All proportions are expressed above as weight percent of the catalyst as it is charged to the reaction vessel.

The present invention is particularly advantageous when used in conjunction with the invention described in U.S. patent application Ser. No. 800,289, filed of even date herewith by Daniel Hyman and Venkatrao Pai, entitled "Separation of Organic Acid Product and Water From Catalyst After Synthesis." That application describes a method for distillation of the organic acid reaction product and water from the reaction mixture under reduced pressure and preferably using very short residence time in the evaporation zone. By the process of that invention the catalyst of the present invention can be prepared for recycle to the reaction zone from the product recovery zone without need for complicated regeneration of a high concentration sulfuric acid catalyst and without excessive carbonization or deterioration of the hydroxyalkane sulfonic acid and its ester present in the catalyst.

At the beginning of a batch process employing the catalyst, in which CO is reacted with olefin and water in presence of a catalyst, it is convenient to first charge the reactor with the catalyst feed which may contain water, then add CO to bring the pressure to operating pressure. After the catalyst is saturated with CO and the temperature and pressure have been stabilized at selected reaction conditions, the olefin feed is slowly added and CO is added as needed to maintain pressure. As the reaction reaches completion, pressure in the reactor will stabilize without need for addition of CO. The reactor is then cooled, pressure is released and water may be added. At this stage additional water may be needed to complete the organic acid synthesis, if there was not adequate water in the pressure reactor. Also, water may be added to dilute the product stream for more efficient distillation.

In the practice of a process according to the invention the catalyst charged to the reactor will comprise a substantial proportion of olefin sulfonation products. In most preferred embodiments, the catalyst will also comprise a proportion of $H_2SO_4$. In most instances there will be present in the catalyst mixture some water and usually some miscellaneous organic products (e.g. polymers, miscellaneous organic acids and esters, etc.). Most preferred catalysts will be within the following ranges of composition, expressed as wt. percent of catalyst fed to the reactor.

| | Percent |
|---|---|
| Olefin sulfonation products (e.g. HSA and SAE) | 15–90 |
| $H_2SO_4$ | 10–75 |
| Water | 5–20 |
| Miscellaneous organic | 0–15 |

Preferred temperature for the olefin-CO reaction in the pressure vessel usually will be in the range from 50° C. to 100° C. although the process can be operated at other temperatures in the range from about 10° C. to about 150° C. Pressure in the reactor in most preferred embodiments will be in the range from 3000 to 8000 p.s.i.g. although the process can be operated at other pressures in a broader range from about 500 p.s.i.g. up to about 15,000 p.s.i.g.

The ratio of olefin feed to catalyst feed to the pressure reaction zone may be selected within a broad range from about 1:5 to about 1:100 expressed as ratio of parts by weight olefin feed to catalyst feed exclusive of water. For optimum operation, a preferred ratio will usually be in the range from about 1:10 to about 1:40, parts by weight olefin to catalyst.

EXAMPLE I

Synthesis of isobutyric acid by reaction of CO with propylene and water—Batch process Several runs are made using catalyst compositions, charges of catalyst and olefin, and reaction conditions as tabulated in Table I for the respective runs. In each run the catalyst is charged, in the amount shown, to a tantalum-lined rocking autoclave with nominal 300 cc. volume. The catalyst is then heated to the indicated reaction temperature. The vessel is purged several times with CO then pressurized with CO to the pressure shown in Table 1. The autoclave is agitated for one hour to saturate the catalyst with CO. Liquid propylene is then charged to the reactor slowly by pumping at a rate in the range from one to two ml. per minute. As needed, CO is added to maintain pressure in the vessel within the range shown. When the pressure has stabilized without need for addition of CO, the autoclave is cooled, pressure is released and the reactor effluent is mixed with water. The mixture is then distilled in a thin film evaporator under reduced pressure (about 30–70 mm. Hg) at about 150° C., to separate the carboxylic acid product and most of the water overhead, leaving the catalyst in condition for recycle to the pressure reactor. Product yields and recovered catalyst analyses for the several runs are tabulated in Table 1. The product separation is described in more detail in the Hyman and Pai U.S. Pat. application Ser. No. 800,289 mentioned above.

TABLE I

| Run No. | Catalyst composition (wt. percent) | | | | Reactor charge (grams) | | Reaction conditions | | Propylene converted to isobut. acid, percent | Recovered catalyst (wt. percent) | | | |
|---|---|---|---|---|---|---|---|---|---|---|---|---|---|
| | $H_2SO_4$ | $H_2O$ | HSA | SAE | Catalyst | Propylene | ° C. | P.s.i.g. | | $H_2SO_4$ | $H_2O$ | HSA | SAE |
| 1 | 92.3 | 7.7 | | | 225 | 16 | 50 | 1,600 | 92 | 91.5 | 6.3 | 1.4 | 0.5 |
| 2 | 92.3 | 7.7 | | | 187 | 42 | 50 | 1,700 | 74 | 75.6 | 10.4 | 6.5 | 7.2 |
| 3 | 92.3 | 7.7 | | | 214 | 32 | 100 | 1,600 | 47 | 67.5 | 4.7 | 11.7 | 15.6 |
| 4 | 46.3 | 10.4 | 19.7 | 23.5 | 169 | 6.4 | 75 | 4,000 | 64 | 48.0 | 9.2 | 20.0 | 21.5 |
| 5 | 44.3 | 6.0 | 11.5 | 37.9 | 179 | 7.0 | 75 | 4,000 | 67 | 44.5 | 6.5 | 16.1 | 32.6 |
| 6 | 44.3 | 6.0 | 11.5 | 37.9 | 200 | 7.9 | 75 | 5,500 | 75 | 46.8 | 5.7 | 17.3 | 29.7 |
| 7 | | 6.9 | 92.3 | | 210 | 10.5 | 70 | 3,000 | 28 | | 5.8 | 94.0 | |

HSA = 2-hydroxypropane-1-sulfonic acid.
SAE = Mono-sulfate ester of HSA.

The runs numbered 1, 2, and 3 in Table 1 are not presented as examples of the invention but are shown for comparison with the invention. Run No. 1 represents near optimum conditions for the reaction using concentrated $H_2SO_4$ catalyst. Under these conditions the product conversion based on olefin feed is 92% with only 7% conversion to HSA and SAE. Runs 2 and 3 illustrate loss of product conversion and increased olefin sulfonation caused by higher olefin to catalyst ratios and by higher reaction temperatures. The recovered catalyst from all of these runs may be recirculated to the reactor for further use as a catalyst for subsequent runs.

The olefin feed to the reaction may be in a hydrocarbon mixture having as much as 50 or 60 percent of other light hydrocarbons and the like. For example, a typical source for propylene might be a propylene-rich stream from a petro-chemical process or from a petroleum or natural gas refining process, which stream may also contain substantial amounts of other hydrocarbons such as light paraffins or the like.

EXAMPLE II

A continuous process embodying the invention is carried out as follows:

Propylene (100 parts by wt.), carbon monoxide (70 parts by wt.) and recycled catalyst (1920 parts) are fed continuously to a high pressure reaction vessel. The vessel contents are agitated and the contents can be cooled if necessary to maintain the desired temperature level of 55° C. Reactor pressure is maintained at 5000 p.s.i.g. Recycled catalyst comprises water (7% by weight), sulfuric acid (30% by wt.) and propylene sulfonation products (60% by wt.). A make-up stream comprising 170 parts by weight of sulfuric acid and 37 parts by weight of water is also added to the reactor. A reactor product stream containing 6.1% by wt. of isobutyric acid is continuously removed from the reaction vessel. The reactor product stream is diluted with 238 parts by weight of water to reduce the tendency of the isobutyric and sulfonic acid components to decompose. The diluted reactor product stream is continuously fed to a two-stage distillation system for recovery of isobutyric acid and for catalyst recovery. This is described in more detail in Example IV of the aforementioned Hyman and Pai U.S. patent application Ser. No. 800,289.

In the foregoing examples the invention has been described using propylene as the olefin reactant and using carbon monoxide as the carbonylation reactant. The invention may be practiced more broadly as in other embodiments using other selected hydrocarbons containing 3 to 8 carbon atoms and by using formic acid instead of carbon monoxide. In such cases, as will be readily recognized, the alkyl carboxylic acid product will vary according to the selected olefin reactants used and the olefin sulfonation products in the catalyst mixture will also correspond to the selected olefin reactant.

I claim:

1. A process for synthesis of carboxylic acid comprising the reaction of carbon monoxide with a lower aliphatic olefin and water in a reaction mixture consisting essentially of carbon monoxide, a lower aliphatic olefin, and a mixture which, as charged to the reaction consists essentially of
   (a) not more than 20 wt. percent water
   (b) 0 to 85 wt. percent $H_2SO_4$ and
   (c) the remainder, constituting at least 15 wt. percent of this mixture, of hydroxy lower alkane sulfonic acid or a mixture thereof with its sulfuric acid ester.

2. A process defined by claim 1 wherein the defined reaction is carried out at a temperature in the range from 50° to 100° C., under pressure in the range from 1500 to 8000 p.s.i.g.

3. A process defined by claim 2 wherein said carboxylic acid product is isobutyric acid, the reactants are CO, water, and propylene and said alkane sulfonic acid and ester are selected from 2-hydroxypropane-1-sulfonic acid and mixtures thereof with its sulfuric acid ester.

4. A process defined by claim 3 wherein said catalyst consists essentially of 2-hydroxypropane-1-sulfonic acid.

5. A process defined by claim 3 wherein said catalyst consists essentially of 15–90 wt. percent of a mixture of 2-hydroxypropane-1-sulfonic acid and its sulfuric acid ester, 10–75 wt. percent $H_2SO_4$, 5–20 wt. percent water and not more than 15 wt. percent miscellaneous organic by-products.

References Cited
UNITED STATES PATENTS

| | | | |
|---|---|---|---|
| 2,419,131 | 4/1947 | Ford | 260—533 |
| 3,282,973 | 11/1966 | Devine et al. | 260—533 |

LORRAINE A. WEINBERGER, Primary Examiner

R. D. KELLY, Assistant Examiner

U.S. Cl. X.R.

260—413